(12) United States Patent
Oyama et al.

(10) Patent No.: US 11,223,047 B2
(45) Date of Patent: Jan. 11, 2022

(54) NON-AQUEOUS ELECTROLYTE SECONDARY BATTERY, AND METHOD OF PRODUCING NON-AQUEOUS ELECTROLYTE SECONDARY BATTERY

(71) Applicant: TOYOTA JIDOSHA KABUSHIKI KAISHA, Toyota (JP)

(72) Inventors: Yutaka Oyama, Toyota (JP); Yuji Yokoyama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/369,796

(22) Filed: Mar. 29, 2019

(65) Prior Publication Data

US 2019/0305314 A1  Oct. 3, 2019

(30) Foreign Application Priority Data

Mar. 30, 2018  (JP) .............................. JP2018-067961

(51) Int. Cl.
  *H01M 4/62*  (2006.01)
  *H01M 10/058*  (2010.01)
  *H01M 4/02*  (2006.01)

(52) U.S. Cl.
  CPC ......... *H01M 4/622* (2013.01); *H01M 10/058* (2013.01); *H01M 2004/021* (2013.01)

(58) Field of Classification Search
  CPC ........... H01M 4/622; H01M 2004/021; H01M 10/058
  See application file for complete search history.

(56) References Cited

U.S. PATENT DOCUMENTS

| | | | |
|---|---|---|---|
| 5,981,107 A * | 11/1999 | Hamano | H01M 4/0402 429/231.95 |
| 2007/0048602 A1* | 3/2007 | Kim | H01M 10/0525 429/144 |
| 2008/0212261 A1* | 9/2008 | Ajayan | H01G 11/56 361/502 |

(Continued)

FOREIGN PATENT DOCUMENTS

| | | |
|---|---|---|
| JP | 2017-130451 A | 7/2017 |
| KR | 10-0670483 B1 | 1/2007 |
| KR | 10-2015-0122122 A | 10/2015 |

*Primary Examiner* — Osei K Amponsah
(74) *Attorney, Agent, or Firm* — Sughrue Mion, PLLC

(57) ABSTRACT

A non-aqueous electrolyte secondary battery includes an electrode array and an electrolyte solution. The electrode array includes a positive electrode that includes a positive electrode current collector and a positive electrode composite material layer; a negative electrode that includes a negative electrode current collector and a negative electrode composite material layer; and a separator. The electrode array includes cellulose nanofibers. At least one of the peel strength between the positive electrode current collector and the positive electrode composite material layer and the peel strength between the negative electrode current collector and the negative electrode composite material layer is smaller than both the peel strength between the separator and the positive electrode composite material layer and the peel strength between the separator and the negative electrode composite material layer. The greater of the two peel strengths is at least 1.5 times greater than the smaller of the two.

15 Claims, 6 Drawing Sheets

(56) References Cited

U.S. PATENT DOCUMENTS

| | | | |
|---|---|---|---|
| 2016/0005551 A1* | 1/2016 | Ishii | H01M 4/62 |
| | | | 429/217 |
| 2016/0087306 A1* | 3/2016 | Lee | H01M 10/0525 |
| | | | 429/317 |
| 2019/0074499 A1* | 3/2019 | Ogawa | H01M 50/411 |

* cited by examiner

NON-AQUEOUS ELECTROLYTE SECONDARY BATTERY, AND METHOD OF PRODUCING NON-AQUEOUS ELECTROLYTE SECONDARY BATTERY

This nonprovisional application is based on Japanese Patent Application No. 2018-067961 filed on Mar. 30, 2018, with the Japan Patent Office, the entire contents of which are hereby incorporated by reference.

BACKGROUND

Field

The present disclosure relates to a non-aqueous electrolyte secondary battery and a method of producing a non-aqueous electrolyte secondary battery.

Description of the Background Art

Japanese Patent Laying-Open No. 2017-130451 describes the following: using cellulose nanofibers as a binder for an electrode composite material in a non-aqueous electrolyte secondary battery enables strong adhesion between the particles of the electrode active material and also between the electrode active material and the current collector.

SUMMARY

In the non-aqueous electrolyte secondary battery disclosed in Japanese Patent Laying-Open No. 2017-130451, the following phenomenon shown in FIG. 2 may occur: when a nail 6 penetrates into a battery in the direction of the black arrow and passes through an electrode (a positive electrode 1 and a negative electrode 2) and through a separator 3, detachment may occur primarily between the electrode and separator 3 (between negative electrode 2 and separator 3 in FIG. 2). When detachment occurs this way, there is a high possibility of both positive electrode 1 (a positive electrode current collector 11) and negative electrode 2 (a negative electrode current collector 21) coming into contact with nail 6 (as shown in FIG. 2), potentially leading to a flow of a short-circuit current (shown by the white arrow) and the resulting heat generation.

An object of the present disclosure is to provide a non-aqueous electrolyte secondary battery in which a flow of a short-circuit current upon nail penetration may be mitigated.

In the following, the technical structure and the effects according to the present disclosure are described. It should be noted that part of the action mechanism according to the present disclosure is based on presumption. Therefore, the scope of claims should not be limited by whether or not the action mechanism is correct.

[1] A non-aqueous electrolyte secondary battery includes an electrode array and an electrolyte solution.

The electrode array includes a positive electrode that includes a positive electrode current collector and a positive electrode composite material layer disposed on a surface of the positive electrode current collector; a negative electrode that includes a negative electrode current collector and a negative electrode composite material layer; and a separator that is interposed between the positive electrode and the negative electrode.

The electrode array includes cellulose nanofibers.

At least one of the peel strength between the positive electrode current collector and the positive electrode composite material layer and the peel strength between the negative electrode current collector and the negative electrode composite material layer is smaller than both the peel strength between the separator and the positive electrode composite material layer and the peel strength between the separator and the negative electrode composite material layer.

The greater of the peel strength between the positive electrode current collector and the positive electrode composite material layer and the peel strength between the negative electrode current collector and the negative electrode composite material layer is at least 1.5 times greater than the smaller of the two.

FIG. 1 is a conceptual sectional view of the electrode array for illustrating the action mechanism according to the present disclosure. FIG. 1 conceptually shows a partial cross section of an electrode array 5 in a thickness direction of electrode array 5, and in FIG. 1, a nail 6 has penetrated into the non-aqueous electrolyte secondary battery according to the present disclosure (which may be simply referred to as "battery" hereinafter) in the direction of the black arrow and has passed through an electrode (a positive electrode 1 and a negative electrode 2) and through a separator 3.

Referring to FIG. 1 that illustrates the non-aqueous electrolyte secondary battery according to [1] above, cellulose nanofibers 4 link to inner walls of pores in both the electrode composite material layer (a positive electrode composite material layer 12, a negative electrode composite material layer 22) and separator 3, both of which are porous; as a result, the bonding strength between the electrode composite material layer and separator 3 (between positive electrode composite material layer 12 and separator 3, and between negative electrode composite material layer 22 and separator 3) is increased. It should be noted that FIG. 1 is merely a conceptual view, in which a plurality of shorter cellulose nanofibers being linked together are schematically shown as a single cellulose nanofiber 4. Therefore, the dimensions of cellulose nanofibers 4 in FIG. 1 are not related to the fiber diameter or the fiber length of the cellulose nanofibers according to the present disclosure.

The bonding strength of the electrode current collector (a positive electrode current collector 11, a negative electrode current collector 21) is not greatly improved by the cellulose nanofibers because the surface of the electrode current collector is smooth and dense (with no pores). Therefore, the bonding strength between the electrode current collector and the electrode composite material layer (between positive electrode current collector 11 and positive electrode composite material layer 12, and between negative electrode current collector 21 and negative electrode composite material layer 22) is not increased and is smaller than the bonding strength between the electrode composite material layer and separator 3. This means that one of (or both) the interface between positive electrode current collector 11 and positive electrode composite material layer 12 and the interface between negative electrode current collector 21 and negative electrode composite material layer 22 has the smallest bonding strength (peel strength) of all the bonding strengths within electrode array 5. As a result, upon penetration of nail 6 into electrode array 5, detachment is likely to occur only at the interface with the smallest peel strength (in FIG. 1, at the interface between negative electrode current collector 21 and negative electrode composite material layer 22). When detachment occurs this way, it is highly likely that positive electrode 1 is sandwiched between two negative electrodes 2 (as shown in FIG. 1) and thereby negative electrode 2 alone comes into contact with nail 6. In that case, a flow of a short-circuit current caused by nail 6 in contact with both positive electrode 1 and negative electrode 2 is mitigated. When the site of contact between nail 6 and components of electrode array 5 is regulated this way, a flow of a short-circuit current upon nail penetration may be mitigated.

If the bonding strength between positive electrode current collector 11 and positive electrode composite material layer 12 is equal to the bonding strength between negative electrode current collector 21 and negative electrode composite material layer 22, however, it is highly likely that detachment occurs at both the interface between positive electrode current collector 11 and positive electrode composite material layer 12 and the interface between negative electrode current collector 21 and negative electrode composite material layer 22 upon penetration of nail 6 into electrode array 5. When detachment occurs this way, it is highly likely that both positive electrode 1 and negative electrode 2 come into contact with nail 6 and thereby a flow of a short-circuit current tends to occur.

In the non-aqueous electrolyte secondary battery according to [1] above, the greater of the peel strength between positive electrode current collector 11 and positive electrode composite material layer 12 and the peel strength between negative electrode current collector 21 and negative electrode composite material layer 22 is at least 1.5 times greater than the smaller of the two; in other words, the bonding strength between positive electrode current collector 11 and positive electrode composite material layer 12 differs by at least a predetermined amount from the bonding strength between negative electrode current collector 21 and negative electrode composite material layer 22. In this configuration, it is highly likely that detachment occurs at only either the interface between positive electrode current collector 11 and positive electrode composite material layer 12 or the interface between negative electrode current collector 21 and negative electrode composite material layer 22 upon penetration of nail 6 into electrode array 5. Therefore, it is highly likely that only either positive electrode 1 or negative electrode 2 comes into contact with nail 6 (as shown in FIG. 1) and in that case, a flow of a short-circuit current caused by nail 6 in contact with both positive electrode 1 and negative electrode 2 is mitigated.

As discussed above, a flow of a short circuit upon nail penetration is mitigated within the non-aqueous electrolyte secondary battery according to the present disclosure.

[2] The non-aqueous electrolyte secondary battery according to [1] above may include an ionic liquid.

The reason is as follows: carrying out a step of impregnating the electrode array with an ionic liquid containing the cellulose nanofibers dissolved therein (cellulose nanofiber solution) may increase the bonding strength between the electrode composite material layer and separator 3, and this step allows the ionic liquid to remain within the non-aqueous electrolyte secondary battery.

[3] In the non-aqueous electrolyte secondary battery according to [1] or [2] above, the cellulose nanofiber content rate is preferably not lower than 10 vol % and not higher than 30 vol % of the total pore volume of the electrode array.

With the cellulose nanofiber content being too low, the effect of mitigating a short circuit upon nail penetration is not obtained. With the cellulose nanofiber content being too high, the cellulose nanofibers may interfere with the movement of Li ions and battery resistance may increase.

[4] A method of producing the non-aqueous electrolyte secondary battery according to [1] above includes the steps, in the sequence set forth, of:

placing the electrode array in a casing;

impregnating the electrode array with a cellulose nanofiber solution, the cellulose nanofiber solution containing an ionic liquid and the cellulose nanofibers dissolved in the ionic liquid; and injecting the electrolyte solution into the casing.

The cellulose nanofiber content rate of the cellulose nanofiber solution is not lower than 4 mass % of the amount of the ionic liquid.

According to the method of producing a non-aqueous electrolyte secondary battery according to [4] above, impregnation of electrode array 5 with the cellulose nanofiber solution followed by injection of the electrolyte solution into the casing makes the electrolyte solution function as a poor solvent and thereby causes deposition of the cellulose nanofibers. As shown in FIG. 1, cellulose nanofibers 4 link to inner walls of pores in both the electrode composite material layer (positive electrode composite material layer 12, negative electrode composite material layer 22) and separator 3, both of which are porous; as a result, the bonding strength between the electrode composite material layer and separator 3 may be increased.

With the cellulose nanofiber content being too low, the effect of mitigating a short circuit upon nail penetration is not obtained. Therefore, the cellulose nanofiber content rate of the cellulose nanofiber solution is not lower than 4 mass % of the amount of the ionic liquid.

[5] In the method according to [4] above, the cellulose nanofiber content rate of the cellulose nanofiber solution is preferably lower than 20 mass % of the amount of the ionic liquid.

With the cellulose nanofiber content being too high, the cellulose nanofibers may interfere with the movement of Li ions and battery resistance may increase.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

In the following, embodiments according to the present disclosure (herein called "present embodiment") are described. The description below does not limit the scope of claims.

<Non-Aqueous Electrolyte Secondary Battery>

A non-aqueous electrolyte secondary battery according to the present embodiment includes an electrode array and an electrolyte solution.

The electrode array includes a positive electrode that includes a positive electrode current collector and a positive electrode composite material layer disposed on a surface of the positive electrode current collector; a negative electrode that includes a negative electrode current collector and a negative electrode composite material layer; and a separator that is interposed between the positive electrode and the negative electrode.

The electrode array includes cellulose nanofibers.

At least one of the peel strength between the positive electrode current collector and the positive electrode composite material layer and the peel strength between the negative electrode current collector and the negative electrode composite material layer is smaller than both the peel strength between the separator and the positive electrode composite material layer and the peel strength between the separator and the negative electrode composite material layer.

The greater of the peel strength between the positive electrode current collector and the positive electrode composite material layer and the peel strength between the negative electrode current collector and the negative electrode composite material layer is at least 1.5 times greater than the smaller of the two.

As an example of the non-aqueous electrolyte secondary battery according to the present embodiment, a lithium-ion secondary battery is described below. However, the non-aqueous electrolyte secondary battery according to the present embodiment is not limited to a lithium-ion secondary battery. The non-aqueous electrolyte secondary battery according to the present embodiment may be a sodium-ion secondary battery and/or a lithium metal secondary battery, for example.

Figure 3:
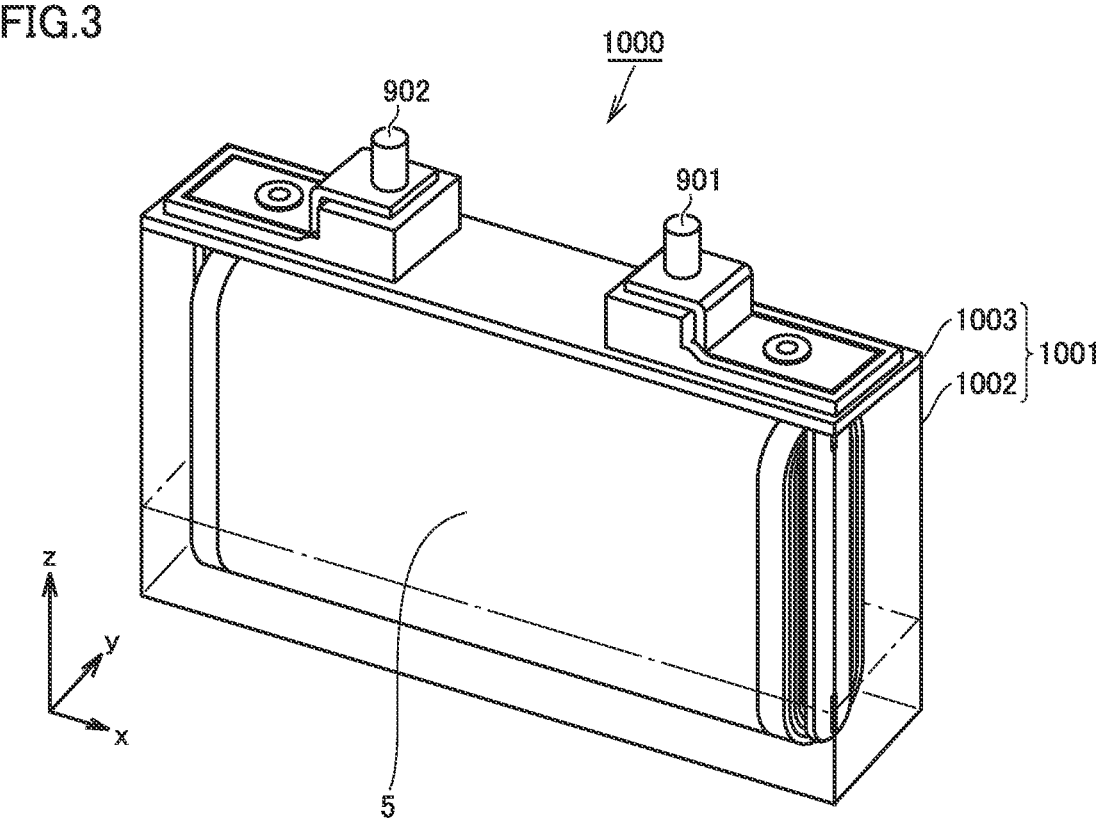
FIG. 3 is a schematic view illustrating the structure of the non-aqueous electrolyte secondary battery according to the present embodiment.

FIG. 3 is a schematic view illustrating the structure of the non-aqueous electrolyte secondary battery according to the present embodiment.

A battery 1000 has a prismatic outer profile. In other words, battery 1000 is a prismatic battery. However, the battery according to the present embodiment is not limited to a prismatic battery. For example, the battery according to the present embodiment may be a cylindrical battery. Battery 1000 includes at least a positive electrode, a negative electrode, a separator, and an electrolyte solution (not shown in FIG. 3).

<<Casing>>

Battery 1000 includes a casing 1001. Casing 1001 is hermetically sealed. Casing 1001 may be made of, for example, aluminum (Al) alloy. As long as casing 1001 may be hermetically sealed, however, the casing may be, for example, a pouch made of an Al-laminated film. In other words, the battery according to the present embodiment may be a laminate-type battery.

Casing 1001 includes a container 1002 and a cap 1003. Cap 1003 is bonded to container 1002 by, for example, laser beam welding. Cap 1003 is equipped with a positive electrode terminal 901 and a negative electrode terminal 902. Cap 1003 may be further equipped with a liquid inlet, a gas-discharge valve, and a current interrupt device (none of these are shown).

<<Electrode Array>>

Figure 4:
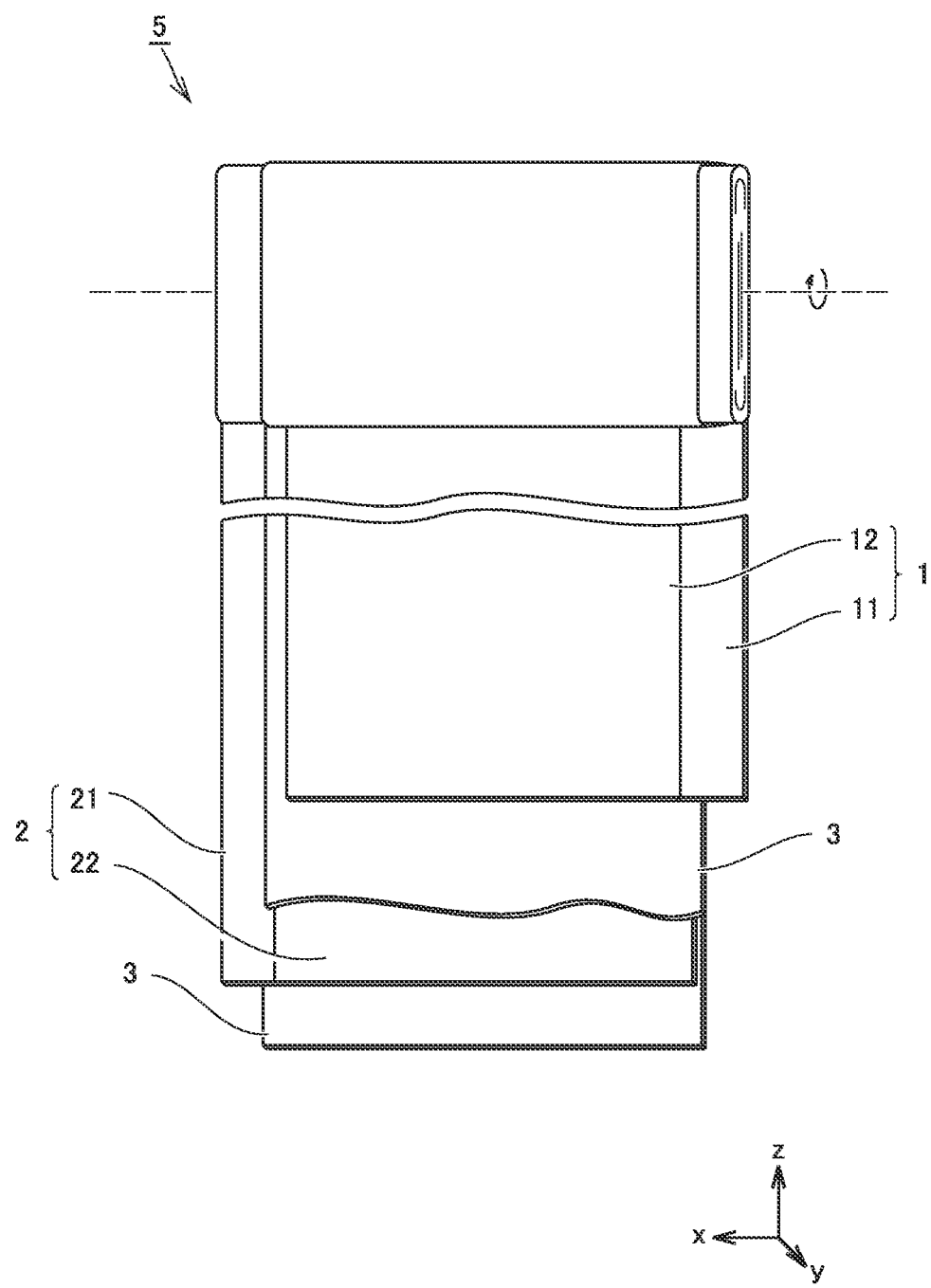
FIG. 4 is a schematic view illustrating the structure of the electrode array according to the present embodiment.

FIG. 4 is a schematic view illustrating the structure of the electrode array according to the present embodiment.

An electrode array 5 is a wound-type one. More specifically, electrode array 5 is formed by stacking a positive electrode 1, a separator 3, a negative electrode 2, and separator 3 in this order and then winding them in a spiral fashion. However, the electrode array according to the present embodiment is not limited to a wound-type one. The electrode array according to the present embodiment may be a stack-type one. The stack-type electrode array may be formed by, for example, alternately stacking positive electrode 1 and negative electrode 2 with separator 3 interposed between positive electrode 1 and negative electrode 2.

In the present embodiment, electrode array 5 may include cellulose nanofibers (which may be simply referred to as "CNFs" hereinafter). More specifically, at least one of positive electrode composite material layer 12, negative electrode composite material layer 22, and separator 3 (all of which are components of the electrode array) contains CNFs. With electrode array 5 thus including CNFs, the bonding strength (peel strength) between separator 3 and the electrode composite material layer is increased.

<<Positive Electrode>>

Figure 5:
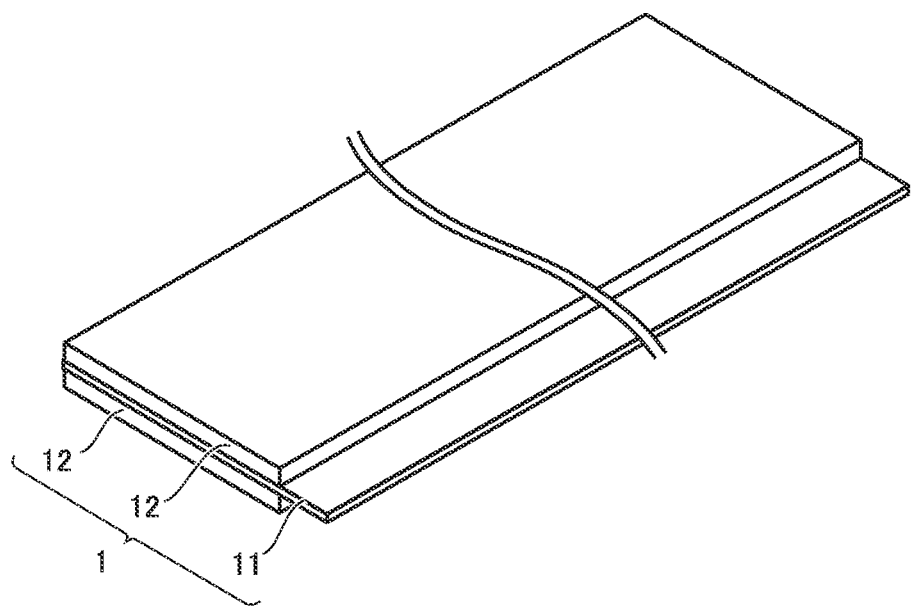
FIG. 5 is a schematic view illustrating the structure of the positive electrode according to the present embodiment.

FIG. 5 is a schematic view illustrating the structure of the positive electrode according to the present embodiment.

Battery 1000 includes at least positive electrode 1. Positive electrode 1 may be a belt-shaped sheet. Positive electrode 1 includes positive electrode composite material layer 12 and a positive electrode current collector 11.

(Positive Electrode Current Collector)

Positive electrode current collector 11 is an electrode substrate that is electrically conductive. Positive electrode current collector 11 may have a thickness not smaller than 9 μm and not greater than 17 μm, for example. Positive electrode current collector 11 may be a pure Al foil and/or an Al alloy foil, for example.

(Positive Electrode Composite Material Layer)

Positive electrode composite material layer 12 is formed on a surface of positive electrode current collector 11. Positive electrode composite material layer 12 may have a thickness not smaller than 100 μm and not greater than 200 μm, for example. Positive electrode composite material layer 12 contains at least a positive electrode active material. Positive electrode composite material layer 12 may contain, for example, the positive electrode active material in an amount not lower than 80 mass % and not higher than 98 mass %, a conductive material in an amount not lower than 1 mass % and not higher than 8 mass %, a binder in an amount not lower than 0.5 mass % and not higher than 8 mass %, and CNFs in an amount not lower than 0.5 mass % and not higher than 4 mass %.

The positive electrode active material is not particularly limited. The positive electrode active material may be $LiCoO_2$, $LiNiO_2$, $LiMnO_2$, $LiMn_2O_4$, $LiNi_{1/3}Co_{1/3}Mn_{1/3}O_2$, $LiNi_{0.82}Co_{0.15}Mn_{0.03}O_2$, and/or $LiFePO_4$, for example. Only one type of the positive electrode active material may be used. Two or more types of the positive electrode active material may be used in combination.

The positive electrode active material may have a D50 not lower than 1 μm and not higher than 30 μm, for example. The "D50" herein refers to the particle size in volume-based particle size distribution obtained by laser diffraction and scattering at which the cumulative particle volume (accumulated from the side of small sizes) reaches 50% of the total particle volume.

The conductive material and the binder are not particularly limited. The conductive material may be acetylene black (AB), furnace black, vapor grown carbon fibers (VGCF), and/or graphite, for example. The binder may be polyvinylidene difluoride (PVDF), styrene-butadiene rubber (SBR), and/or polytetrafluoroethylene (PTFE), for example.

(Cellulose Nanofibers)

The cellulose nanofibers (CNFs) consist of cellulose.

The fiber diameter of the CNFs is 1 to 1000 nm, preferably 1 to 100 nm. The reason is as follows: the diameter of the pores in the separator and in the electrode composite material layer is about 10 to 1000 nm; therefore, in the configuration in which the CNFs have a fiber length shorter than that diameter, the effect of increasing the bonding strength between the separator and the electrode composite material layer may be sufficiently exhibited. It should be noted that if cellulose fibers with a fiber diameter of the order of micrometers are used instead of the CNFs with a fiber diameter of the order of nanometers, the cellulose fibers cannot enter the pores in the electrode composite material layer and in separator 3 and thereby the effect of increasing the bonding strength between the electrode composite material layer and separator 3 is less likely to be obtained.

The fiber length of the CNFs is not particularly limited. The lower limit to the fiber length is not particularly limited because the effect of increasing the bonding strength between the separator and the electrode composite material layer is still obtained even with short CNFs as long as the CNFs are linked together to form long fibers. It is impossible to produce CNFs with a very long fiber length due to the limitation of the production processes and therefore the fiber length is, for example, not longer than 100 μm.

In the battery according to the present embodiment, the cellulose nanofiber content rate is preferably not lower than 10 vol % and not higher than 30 vol % of the total pore volume of the electrode array. With the CNF content being too low, the effect of mitigating a short circuit upon nail penetration is not obtained. With the CNF content being too high, the CNFs may interfere with the movement of Li ions and battery resistance may increase.

The total pore volume of electrode array 5 within the battery may be measured by the following processes: taking the electrode array out of the battery; then centrifuging the electrode array to remove liquid (including the electrolyte solution and the ionic liquid) from the pores; and then (i) measuring the volume of the electrolyte solution thus separated or (ii) identifying the constituent materials of the electrode array by chemical analysis and calculating the total pore volume using the specific gravity of each constituent material and the volume of the electrode array. The CNF content of electrode array 5 may be measured by the following processes: taking the electrode array out of the battery; then identifying the constituent materials of the electrode array by chemical analysis; and then calculating the CNF content by using the specific gravity of each constituent material and the volume of the electrode array.

<<Negative Electrode>>

Figure 6:
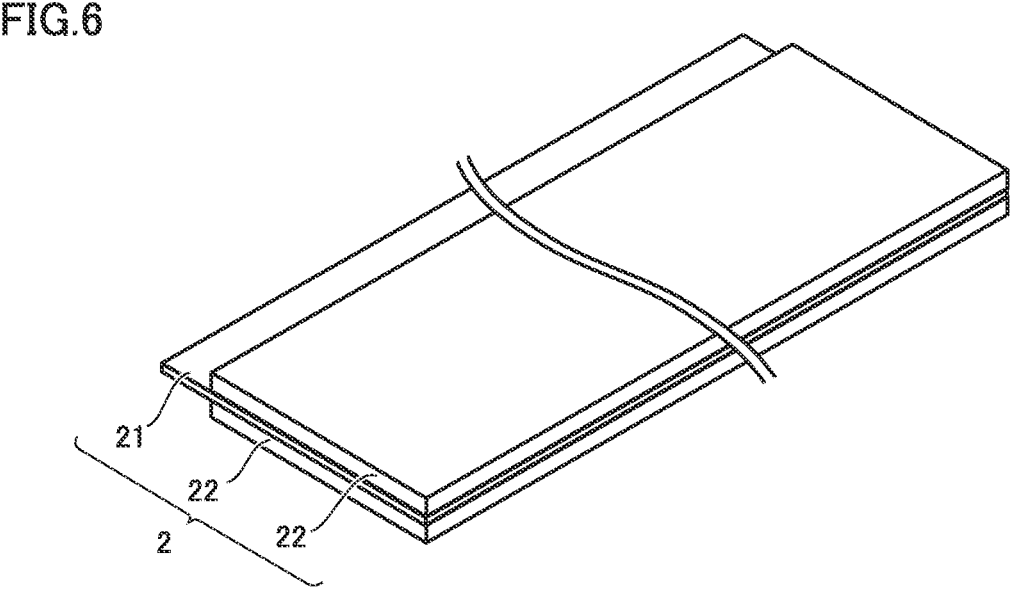
FIG. 6 is a schematic view illustrating the structure of the negative electrode according to the present embodiment.

FIG. 6 is a schematic view illustrating the structure of the negative electrode according to the present embodiment. Battery 1000 includes at least negative electrode 2. Negative electrode 2 may be a belt-shaped sheet. Negative electrode 2 includes a negative electrode current collector 21 and negative electrode composite material layer 22.

(Negative Electrode Composite Material Layer)

Negative electrode composite material layer 22 is formed on a surface of negative electrode current collector 21. Negative electrode composite material layer 22 may be formed on both sides of negative electrode current collector 21. Negative electrode composite material layer 22 may have a thickness not smaller than 80 μm and not greater than 250 μm, for example. Negative electrode composite material layer 22 contains at least a negative electrode active material. Negative electrode composite material layer 22 may contain, for example, the negative electrode active material in an amount not lower than 90 mass % and not higher than 99 mass %, a binder in an amount not lower than 0.5 mass % and not higher than 6 mass %, and CNFs in an amount not lower than 0.5 mass % and not higher than 4 mass %.

The negative electrode active material electrochemically occludes and releases electric charge carriers (lithium ions in the present embodiment). The negative electrode active material is not particularly limited. The negative electrode active material may be artificial graphite, natural graphite, soft carbon, hard carbon, silicon, silicon oxide, silicon-based alloy, tin, tin oxide, and/or tin-based alloy, for example. Only one type of the negative electrode active material may be used. Two or more types of the negative electrode active material may be used in combination. The binder is not particularly limited. The binder may be carboxymethylcellulose (CMC) and/or styrene-butadiene rubber (SBR), for example. The negative electrode active material may have a D50 not lower than 1 μm and not higher than 30 μm, for example.

(Negative Electrode Current Collector)

Negative electrode current collector 21 is an electrode substrate that is electrically conductive. Negative electrode current collector 21 may have a thickness not smaller than 5 μm and not greater than 50 μm, for example. Desirably, negative electrode current collector 21 has a thickness not smaller than 7 μm and not greater than 12 μm. Negative electrode current collector 21 may be a pure copper (Cu) foil and/or a Cu alloy foil, for example.

<<Separator>>

FIG. 4 is a schematic view illustrating the structure of electrode array 5 according to the present embodiment. As shown in FIG. 4, battery 1000 may include separator 3. Separator 3 is interposed between positive electrode 1 and negative electrode 2.

Separator 3 is an electrically insulating porous film and has a belt-shape outer profile. Separator 3 electrically insulates positive electrode 1 from negative electrode 2. Separator 3 may be a porous film made of, for example, PE and/or PP.

Separator 3 may include CNFs. Separator 3 may include CNFs in an amount not lower than 0.5 mass % and not higher than 5 mass %, for example.

Separator 3 may have a monolayer structure, for example. Separator 3 may consist of a porous PE film or a porous PP film, for example. Separator 3 may have a multilayer structure, for example. Separator 3 may be formed by, for example, stacking a porous PP film, a porous PE film, and a porous PP film in this order. Separator 3 may have a heat-resistant layer on a surface thereof. The heat-resistant layer is a layer containing a heat-resistant material. The heat-resistant material may be alumina and/or polyimide, for example.

Separator 3 may have a thickness not smaller than 5 μm and not greater than 30 μm, for example. Desirably, separator 3 has a thickness not smaller than 10 μm and not greater than 30 μm.

<<Electrolyte Solution>>

Battery 1000 may include an electrolyte solution. The electrolyte solution contains at least a lithium (Li) salt and a solvent. The electrolyte solution may contain the Li salt in an amount not lower than 0.5 mol/L and not higher than 2 mol/L, for example. The Li salt is a supporting electrolyte. The Li salt is dissolved in the solvent. The Li salt may be LiPF$_6$, LiFSI, LiBF$_4$, Li[N(FSO$_2$)$_2$], and/or Li[N(CF$_3$SO$_2$)$_2$], for example. Only one type of the Li salt may be used. Two or more types of the Li salt may be used in combination.

The solvent is aprotic. In other words, the electrolyte solution according to the present embodiment is a non-aqueous electrolyte. The solvent may be a mixture of a cyclic carbonate and a chain carbonate, for example. The mixing ratio may be "(cyclic carbonate):(chain carbonate)=1:9 to 5:5 (volume ratio)", for example.

The cyclic carbonate may be ethylene carbonate (EC), propylene carbonate (PC), butylene carbonate (BC), and/or fluoroethylene carbonate (FEC), for example. Only one type of the cyclic carbonate may be used. Two or more types of the cyclic carbonate may be used in combination.

The chain carbonate may be dimethyl carbonate (DMC), ethyl methyl carbonate (EMC), and/or diethyl carbonate (DEC), for example. Only one type of the chain carbonate may be used. Two or more types of the chain carbonate may be used in combination.

The solvent may contain a lactone, a cyclic ether, a chain ether, and/or a carboxylic acid ester, for example. The lactone may be γ-butyrolactone (GBL) and/or δ-valerolactone, for example. The cyclic ether may be tetrahydrofuran (THF), 1,3-dioxolane, and/or 1,4-dioxane, for example. The chain ether may be 1,2-dimethoxyethane (DME), for example. The carboxylic acid ester may be methyl formate (MF), methyl acetate (MA), and/or methyl propionate (MP), for example.

The electrolyte solution may further contain various functional additives in addition to the Li salt and the solvent. The electrolyte solution may contain the functional additives in an amount not lower than 1 mass % and not higher than 5 mass %, for example. Examples of the functional additives include a gas generation agent (anti-overcharging additive) and a solid electrolyte interface (SEI) film-forming agent. The gas generation agent may be cyclohexylbenzene (CHB) and/or biphenyl (BP), for example. The SEI-film-forming agent may be vinylene carbonate (VC), vinylethylene carbonate (VEC), Li[B(C$_2$O$_4$)$_2$], LiPO$_2$F$_2$, propane sultone (PS), and/or ethylene sulfite (ES), for example.

(Ionic Liquid)

Battery 1000 may further include an ionic liquid. The reason is as follows: in order to increase the bonding strength between the electrode composite material layer and separator 3, a step of impregnating electrode array 5 with an ionic liquid containing CNFs dissolved therein (cellulose nanofiber solution) may be carried out, as described below, and this step allows the ionic liquid to remain within the battery.

The ionic liquid is a salt in a liquid state (a compound formed by ionic bonding of an anion derived from an acid and a cation derived from a base. The ionic liquid is not particularly limited provided that it is capable of dissolving cellulose. Examples of the ionic liquid capable of dissolving cellulose include ionic liquids represented by formulae (1) to (6) listed below.

(1)

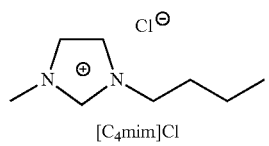

[C$_4$mim]Cl

-continued (2)

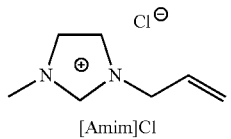

[Amim]Cl (3)

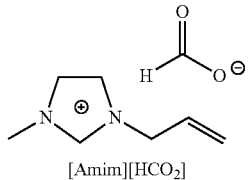

[Amim][HCO$_2$]

(4)

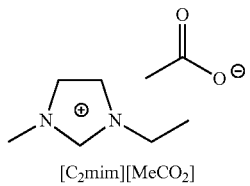

[C$_2$mim][MeCO$_2$]

(5)

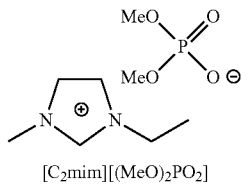

[C$_2$mim][(MeO)$_2$PO$_2$]

(6)

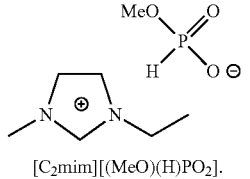

[C$_2$mim][(MeO)(H)PO$_2$].

A commercially available ionic liquid may be used. For example, ILA48-32 (Cellulose-dissolving ionic liquid) manufactured by Koei Chemical Co., Ltd. may be suitable. ILA48-32 is an ionic liquid containing a quaternary ammonium cation and a carboxylate anion.

The amount of the ionic liquid used in the battery may be 25 to 75 mass % of the amount of the electrolyte solution injected into the casing. The amount of CNFs dissolved in the ionic liquid may be 1 to 30 mass % of the amount of the ionic liquid.

The CNFs and the ionic liquid may be identified by NMR spectrometry. As the NMR spectrometry technique, H-NMR spectrometry (on Spectrometer Z manufactured by JEOL Ltd., for example) or the like may be used.

(Peel Strength)

In the present embodiment, at least one of the peel strength between positive electrode current collector 11 and positive electrode composite material layer 12 and the peel strength between negative electrode current collector 21 and negative electrode composite material layer 22 is smaller than both the peel strength between separator 3 and positive electrode composite material layer 12 and the peel strength between separator 3 and negative electrode composite material layer 22. As a result, the interface that is the most susceptible within electrode array 5 to detachment upon penetration of nail 6 is either the interface between positive electrode current collector 11 and positive electrode composite material layer 12 or the interface between negative electrode current collector 21 and negative electrode composite material layer 22.

In addition, it is preferable that "the smaller of the peel strength between separator 3 and positive electrode composite material layer 12 and the peel strength between separator 3 and negative electrode composite material layer 22" be at least 1.5 times greater than "the smaller of the peel strength between positive electrode current collector 11 and positive electrode composite material layer 12 and the peel strength between negative electrode current collector 21 and negative electrode composite material layer 22". In other words, it is preferable that the ratio of [peel strength between separator 3 and the electrode composite material layer in either the positive or negative electrode (whichever gives the smaller peel strength)]/[peel strength between the electrode current collector and the electrode composite material layer in either the positive or negative electrode (whichever gives the smaller peel strength)] (hereinafter, this ratio is called "separator/(current collector) peel strength ratio") be not lower than 1.5. This condition ensures that the interface that is the most susceptible within electrode array 5 to detachment upon penetration of nail 6 is either the interface between positive electrode current collector 11 and positive electrode composite material layer 12 or the interface between negative electrode current collector 21 and negative electrode composite material layer 22.

In the present embodiment, the greater of the peel strength between positive electrode current collector 11 and positive electrode composite material layer 12 and the peel strength between negative electrode current collector 21 and negative electrode composite material layer 22 is at least 1.5 times greater than the smaller of the two. In other words, the ratio of [peel strength between the electrode current collector and the electrode composite material layer in either the positive or negative electrode (whichever gives the greater peel strength)]/[peel strength between the electrode current collector and the electrode composite material layer in either the positive or negative electrode (whichever gives the smaller peel strength)] (hereinafter, this ratio is called "between-positive-and-negative-electrodes peel strength ratio") is not lower than 1.5.

With this ratio being not lower than 1.5, the bonding strength between positive electrode current collector 11 and positive electrode composite material layer 12 differs by at least a predetermined amount from the bonding strength between negative electrode current collector 21 and negative electrode composite material layer 22. In this configuration, it is highly likely that detachment occurs at only either the interface between positive electrode current collector 11 and positive electrode composite material layer 12 or the interface between negative electrode current collector 21 and negative electrode composite material layer 22 upon penetration of nail 6 into electrode array 5. As a result, a flow of a short-circuit current caused by nail 6 in contact with both positive electrode 1 and negative electrode 2 is mitigated.

Examples of the technique employed for obtaining a between-positive-and-negative-electrodes peel strength ratio not lower than 1.5 include the following ones: a technique that involves adopting different amounts of binder in the electrode composite material layer between positive electrode 1 and negative electrode 2; and a technique that involves adopting different compression intensities (namely, adopting different porosities of the electrode composite material layers) between positive electrode 1 and negative electrode 2 in the situation before stacking the electrodes onto separator 3.

<Method of Producing Non-Aqueous Electrolyte Secondary Battery>

A method of producing the non-aqueous electrolyte secondary battery according to the present embodiment includes at least an electrode-array-placing step, a CNF-solution-impregnating step, and an electrolyte-solution-injecting step, in this sequence. Each step is described below.

(Electrode-Array-Placing Step)

In this step, the electrode array is placed in the casing.

(CNF-Solution-Impregnating Step)

In this step, electrode array 5 is impregnated with the cellulose nanofiber solution (CNF solution) that contains the ionic liquid and the cellulose nanofibers (CNFs) dissolved in the ionic liquid. Cellulose does not dissolve in a typical electrolyte solution but it can dissolve in an ionic liquid.

The expression "electrode array 5 is impregnated with the cellulose nanofiber solution" means that at least one of positive electrode composite material layer 12, negative electrode composite material layer 22, and separator 3 is impregnated with the CNF solution. From the viewpoint of reliably increasing the bonding strength between separator 3 and the electrode composite material layer, it is preferable to impregnate all of positive electrode composite material layer 12, negative electrode composite material layer 22, and separator 3 with the CNF solution.

A specific example of this step is carried out as follows: the CNF solution is injected into casing 1001 that accommodates electrode array 5 (before injection of the electrolyte solution); then, this state (in which electrode array 5 is immersed in the CNF solution) is maintained for a predetermined duration; thus, impregnation of electrode array 5 with the CNF solution may be achieved.

Another specific example of this step is carried out as follows: the CNFs are mixed with a material of electrode array 5 (at least one of positive electrode composite material layer 12, negative electrode composite material layer 22, and separator 3), or are applied to at least one of positive electrode composite material layer 12, negative electrode composite material layer 22, and separator 3; then, the ionic liquid is injected into casing 1001 that accommodates electrode array 5 (before injection of the electrolyte solution), and thus the CNFs present in the electrode array are dissolved in the ionic liquid; then, this state (in which electrode array 5 is immersed in the CNF solution) is maintained for a predetermined duration; thus, impregnation of electrode array 5 with the CNF solution may be achieved.

In addition to these aspects, any other aspect capable of impregnating electrode array 5 with the CNF solution is also subsumed in this step.

The CNF content rate of the CNF solution is not lower than 4 mass % of the amount of the ionic liquid. It is because in the configuration in which the CNF content is too low, the effect of mitigating a short circuit upon nail penetration is not obtained.

Preferably, the CNF content rate of the CNF solution is lower than 20 mass % of the amount of the ionic liquid. With the CNF content being too high, the CNFs may interfere with the movement of Li ions and battery resistance may increase.

The CNF content of electrode array 5 may be adjusted by changing, among others, the concentration of the CNF solution and/or the amount of CNFs to add to separator 3 and to the electrode composite material layer.

By thus reinforcing the entire electrode array 5 with CNFs, the bonding strength between the electrode composite material layer and the electrode current collector is relatively decreased. It is because the effect of CNFs to increase the bonding strength is exhibited on porous bodies, such as components except the electrode current collector (namely, components including separator 3 and the electrode composite material layer) but not on smooth surfaces, such as the surface of the electrode current collector (metal foil).

As other techniques for increasing the adhesive strength between separator 3 and the electrode composite material layer, the following techniques may be considered: a technique that involves pushing separator 3 into the electrode composite material layer to obtain an anchoring effect; and a technique that involves bonding separator 3 to the electrode composite material layer by using a strong adhesive. If any of these other techniques is employed, however, the surface of the electrode active material within the electrode composite material layer is covered with separator 3 or the adhesive and thereby battery resistance increases. The present embodiment, on the other hand, in which CNFs are used to increase the adhesive strength between separator 3 and the electrode, is capable of improving the adhesive strength while maintaining unoccupied space and is thereby capable of mitigating an increase in battery resistance.

(Electrolyte-Solution-Injecting Step)

In this step, the electrolyte solution is injected into the casing.

Figure 1:
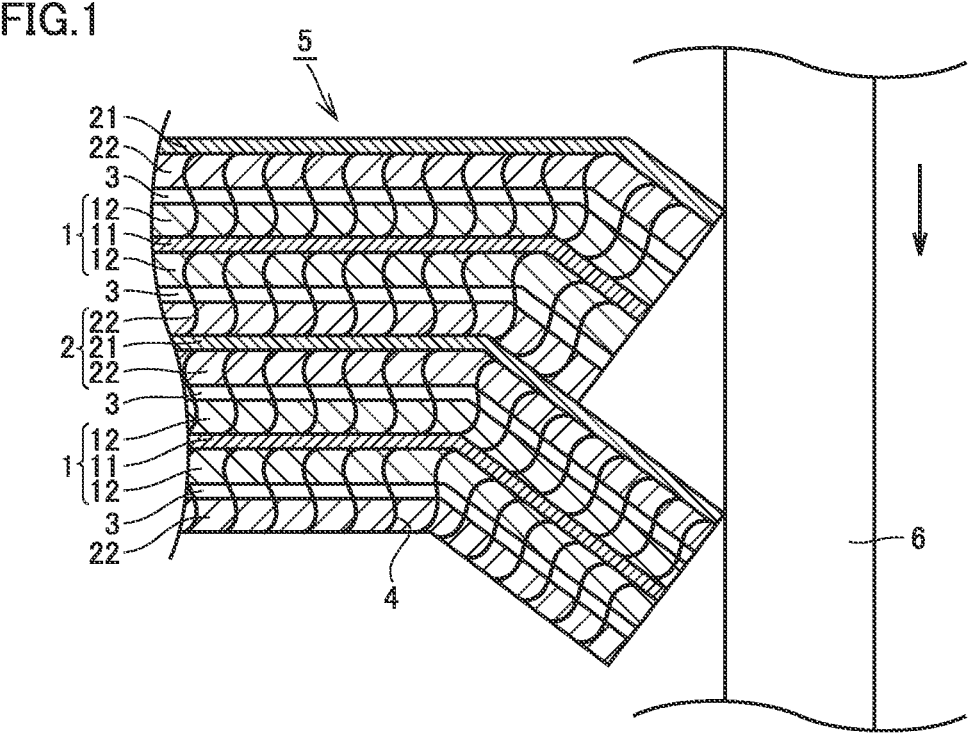
FIG. 1 is a conceptual sectional view of the electrode array for illustrating the action mechanism according to the present disclosure.

After the CNF-solution-impregnating step is carried out in which electrode array 5 is impregnated with the CNF solution, the electrolyte-solution-injecting step is carried out in which the electrolyte solution is injected into casing 1001. As a result, the electrolyte solution functions as a poor solvent and thereby causes deposition of the CNFs within, for example, pores in the electrode array. Consequently, as shown in FIG. 1, CNFs 4 link to inner walls of pores in both the electrode composite material layer (positive electrode composite material layer 12, negative electrode composite material layer 22) and separator 3, both of which are porous; as a result, the bonding strength between the electrode composite material layer and separator 3 is increased.

<Applications, Etc.>

In battery 1000 according to the present embodiment, an increase in the battery temperature upon nail penetration may be mitigated. Examples of the applications in which this feature is useful include power supplies for driving, for example, hybrid vehicles (HVs), plug-in hybrid vehicles (PHVs), and electric vehicles (EVs). It should be noted that the use of battery 1000 according to the present embodiment is not limited to vehicle-mounted applications. Battery 1000 according to the present embodiment may be used in any application.

EXAMPLES

Next, examples according to the present disclosure are described. The description below does not limit the scope of claims.

Comparative Example 1

1. Preparation of Positive Electrode

The materials described below were prepared.

Positive electrode active material: $LiNi_{1/3}Co_{1/3}Mn_{1/3}O_2$ (NCM)

Conductive material: AB

Binder: PVDF

Solvent: NMP

Positive electrode current collector: Al foil (20 μm in thickness)

NCM, AB, PVDF, and NMP were mixed in a planetary mixer. Thus, a positive electrode composite material slurry was prepared. The resulting positive electrode composite material slurry had a solid-content composition of "NCA:AB:PVDF=100:10:3" (mass ratio). The positive electrode composite material slurry was applied to the surface (both sides) of positive electrode current collector 11 with a die coater, followed by drying, and thus positive electrode composite material layer 12 was formed.

Positive electrode composite material layer 12 and positive electrode current collector 11 were compressed with a rolling apparatus. Thus, positive electrode 1 was prepared. Positive electrode 1 had a thickness of 70 μm. Positive electrode composite material layer 12 had a square shape (30 mm×30 mm).

2. Preparation of Negative Electrode

The materials described below were prepared.

Negative electrode active material: graphite (20 μm in particle size (D50))

Thickener: CMC

Binder: SBR

Solvent: water

Negative electrode current collector: Cu foil (10 μm in thickness)

Graphite, CMC, SBR, and water were mixed in a planetary mixer. Thus, a negative electrode composite material slurry was prepared. The resulting negative electrode composite material slurry had a solid-content composition of "graphite:CMC:SBR=100:1:1" (mass ratio). The negative electrode composite material slurry was applied to the surface (both sides) of negative electrode current collector 21 with a die coater, followed by drying, and thus negative electrode composite material layer 22 was formed.

Negative electrode composite material layer 22 and negative electrode current collector 21 were compressed with a rolling apparatus. Thus, negative electrode 2 was prepared. Negative electrode 2 had a thickness of 80 μm. Negative electrode composite material layer 22 had a square shape (32 mm×32 mm).

3. Preparation of Separator

As separator 3, a porous film having a three-layer structure ((polypropylene (PP))-(polyethylene (PE))-(polypropylene (PP)) was prepared.

4. Assembly of Battery

To each of positive electrode current collector 11 and negative electrode current collector 21, a current-collecting lead wire was connected. Positive electrode 1, separator 3, and negative electrode 2 were stacked in this order, and thus electrode array 5 consisting of one positive electrode 1, one separator 3, and one negative electrode 2 was formed. Electrode array 5 was placed in a pouch made of an aluminum-laminated film (casing 1001).

An electrolyte solution having a composition described below was prepared.

Solvent: [EC:DMC:EMC=1:1:1 (volume ratio)]

Li salt: $LiPF_6$ (1 M)

The resulting electrolyte solution was injected into casing 1001. Casing 1001 was hermetically sealed. Thus, a battery of Comparative Example 1 was produced.

Comparative Example 2

In a certain amount of water, CNFs in an amount of 5 mass % (wt %) of the amount of water was dispersed. Thus, a CNF dispersion was prepared. The resulting dispersion was applied to the surface (both sides) of the separator with a doctor blade (100 μm in gap width), followed by drying, and thus a CNF layer was formed on each side of separator 3. The thickness of the CNF layer was 10 μm on one side (20 μm on both sides combined). Except these conditions, the same manner as in Comparative Example 1 was adopted to produce a battery of Comparative Example 2.

The CNFs used in Comparative Example 2 had the following dimensions: 10 nm in fiber diameter and 1 μm in length. The fiber diameter and the length of the CNFs were the average fiber diameter and the average length, respectively, of ten CNFs randomly selected in an SEM image(s).

Comparative Example 3

To the positive electrode composite material slurry, CNFs were further added. More specifically, CNFs, NCM, AB, PVDF, and NMP were mixed in a planetary mixer to prepare the positive electrode composite material slurry. The amount of the CNFs was 15 mass % of the total amount of the other solid contents (NCM, AB, and PVDF). Except these conditions, the same manner as in Comparative Example 1 was adopted to produce a battery of Comparative Example 3.

Comparative Example 4

To the negative electrode composite material slurry, CNFs were further added. More specifically, CNFs, graphite, CMC, SBR, and water were mixed in a planetary mixer to prepare the negative electrode composite material slurry. The amount of the CNFs was 15 mass % of the total amount of the other solid contents (graphite, CMC, and SBR). Except these conditions, the same manner as in Comparative Example 1 was adopted to produce a battery of Comparative Example 4.

Example 1

CNFs were dissolved in an ionic liquid (ILA48-32 manufactured by Koei Chemical Co., Ltd.), and thus a CNF solution was prepared. Before the electrolyte solution was injected into the casing, the CNF solution was injected into the casing (added to the electrolyte solution). Then, impregnation was allowed to proceed for two hours. The amount of CNFs dissolved in the ionic liquid was 7 mass % of the amount of the ionic liquid alone. The amount of the ionic liquid was 50 mass % of the amount of the electrolyte solution injected into the casing. Except these conditions, the same manner as in Comparative Example 1 was adopted to produce a battery of Example 1.

Examples 2 to 4

Before the electrolyte solution was injected into the casing, an ionic liquid (ILA48-32 manufactured by Koei Chemical Co., Ltd.) was injected into the casing. Then, impregnation was allowed to proceed for two hours. Except these conditions, the same manner as in Comparative Examples 2 to 4 was adopted to produce batteries of Examples 2 to 4.

Comparative Example 5

CNFs with larger dimensions (1 μm in diameter and 1 mm in length) were used. Except this condition, the same manner as in Example 1 was adopted to produce a battery of Comparative Example 5.

Comparative Example 6

The amount of CNFs dissolved in the ionic liquid was changed to 3 mass % of the amount of the ionic liquid alone. Except this condition, the same manner as in Example 1 was adopted to produce a battery of Comparative Example 6.

Example 5

The amount of CNFs dissolved in the ionic liquid was changed to 20 mass % of the amount of the ionic liquid alone. Except this condition, the same manner as in Example 1 was adopted to produce a battery of Example 5.

Example 6

The separator of Example 2, the positive electrode of Example 3, and the negative electrode of Example 4 were used. Except this condition, the same manner as in Example 5 was adopted to produce a battery of Example 6.

Comparative Example 7

Instead of CNFs, carbon nanotubes were used. Except this condition, the same manner as in Example 1 was adopted to produce a battery of Comparative Example 7.

Comparative Example 8

Instead of CNFs, alumina nanofibers were used. Except this condition, the same manner as in Example 1 was adopted to produce a battery of Comparative Example 8.

Example 7

The amount of CNFs added to each of positive electrode composite material layer 12, negative electrode composite material layer 22, separator 3, and the ionic liquid was changed to ⅕ of the amount of the respective component in Example 6. Except these conditions, the same manner as in Example 6 was adopted to produce a battery of Example 7.

Example 8

CNFs were added to both the positive electrode composite material slurry and the negative electrode composite material slurry. The amount of the CNFs added to the positive electrode composite material slurry was 8 mass % of the total amount of the other solid contents in the positive electrode composite material slurry. The amount of the CNFs added to the negative electrode composite material slurry was also 8 mass % of the total amount of the other solid contents in the negative electrode composite material slurry. Except these conditions, the same manner as in Example 1 was adopted to produce a battery of Example 8.

Example 9

The solid-content composition of the positive electrode composite material slurry was changed to "NCA:AB:PVDF=100:10:1.5" (mass ratio) (namely, the amount of the binder PVDF was decreased). In addition, the solid-content composition of the negative electrode composite material slurry was changed to "graphite:CMC:SBR=100:1:2" (mass ratio) (namely, the amount of the binder SBR was increased). Except these conditions, the same manner as in Example 1 was adopted to produce a battery of Example 9.

Comparative Example 9

The solid-content composition of the negative electrode composite material slurry was changed to "graphite:CMC:SBR=100:1:1.5" (mass ratio) (namely, the ratio of the binder SBR was increased). Except this condition, the same manner as in Example 1 was adopted to produce a battery of Comparative Example 9.

Comparative Example 10

To each side of separator 3, an adhesive (a mixture of 50 mass % PVDF-HFP and 50 mass % polymethyl methacrylate, see Japanese Patent Laying-Open No. 2013-122009) was applied in an amount that was adjusted so that both the peel strength between separator 3 and positive electrode composite material layer 12 and the peel strength between separator 3 and negative electrode composite material layer 22 were equivalent to those in Example 1, respectively. Subsequently, positive electrode 1, separator 3, and negative electrode 2 were stacked in this order. Except these conditions, the same manner as in Comparative Example 1 was adopted to produce a battery of Comparative Example 10.

<Evaluation>

(Measurement of Resistance)

The battery thus prepared was interposed between two flat plates and then restrained with a predetermined pressure, followed by charging to 3.7 V and then discharging at 25° C. at 10 mA for 10 seconds. The voltage drop ΔV (V) during the process was measured, which was used to determine the resistance of the battery (the resistance at normal temperature). The resistance, R, was determined by the following equation:

$$R(\Omega) = \Delta V(V)/0.010(A).$$

The results are shown in column "Resistance" in section "Battery performance" in Table 1.

(Nail Penetration Test)

The battery was charged to 4.1 V at 10 mA at 25° C. (room temperature), followed by a nail penetration test, in which a nail (a Japanese N nail "N65") having a shank diameter of 3 mm was driven into the battery at a rate of 1.0 mm/second. The voltage drop ΔV during nail penetration through the battery was measured. The results are shown in column "Voltage drop during nail penetration" in section "Battery performance" in Table 1. Occurrence of a voltage drop, ΔV, may indicate that an internal short circuit occurred.

<Analysis>

(Peel Strength)

The battery was disassembled, followed by rinsing the electrodes with a solvent such as EMC and then drying the electrodes. By using the electrodes, a sample was prepared that had an interface to be measured. The resulting sample was subjected to measurement in conformity with Japan Industrial Standard (JIS) K 6854-1:1999. Peel strengths 1 to 4 at the four positions listed above, respectively, were obtained. Results are shown in column "peel strength" in Table 1.

Peel strength 1: peel strength between the separator and the positive electrode composite material layer ["Separator-(positive electrode)" in Table 1]

Peel strength 2: peel strength between the separator and the negative electrode composite material layer ["Separator-(negative electrode)" in Table 1]

Peel strength 3: peel strength between the positive electrode current collector and the positive electrode composite material layer ["Within positive electrode" in Table 1]

Peel strength 4: peel strength between the negative electrode current collector and the negative electrode composite material layer ["Within negative electrode" in Table 1]

By using the peel strengths 1 to 4, the "separator/(current collector) peel strength ratio" and the "between-positive-and-negative-electrodes peel strength ratio" were determined.

(Separator/(Current Collector) Peel Strength Ratio)

The smaller of peel strength 1 and peel strength 2 was defined as a peel strength 5.

The smaller of peel strength 3 and peel strength 4 was defined as a peel strength 6.

The value of (peel strength 5)/(peel strength 6) is calculated, which is equivalent to the value of the "separator/(current collector) peel strength ratio", more specifically equivalent to the ratio of [peel strength between separator 3 and the electrode composite material layer in either the positive or negative electrode (whichever gives the smaller peel strength)]/[peel strength between the electrode current collector and the electrode composite material layer in either the positive or negative electrode (whichever gives the smaller peel strength)]. Results are shown in column "Separator/(current collector)" in section "Peel strength ratio" in Table 1.

(Between-Positive-and-Negative-Electrodes Peel Strength Ratio)

The greater of peel strength 3 and peel strength 4 was defined as a peel strength 7.

The value of (peel strength 7)/(peel strength 6) is calculated, which is equivalent to the value of the "between-positive-and-negative-electrodes peel strength ratio", more specifically equivalent to the ratio of [peel strength between the electrode current collector and the electrode composite material layer in either the positive or negative electrode (whichever gives the greater peel strength)]/[peel strength between the electrode current collector and the electrode composite material layer in either the positive or negative electrode (whichever gives the smaller peel strength)]. Results are shown in column "Between-positive-and-negative-electrodes" in section "Peel strength ratio" in Table 1.

(CNF Content Rate Relative to Pore Volume of Electrode Array)

(1) Measurement of Pore Volume of Electrode Array

The total pore volume of the electrode array was measured by the following processes: taking the electrode array out of the battery of each of the examples and comparative examples; then centrifuging the electrode array to remove liquid (including the electrolyte solution and the ionic liquid) from the pores; and then measuring the volume of the electrolyte solution thus separated.

(2) Measurement of Cellulose Content of Electrode Array

The CNF content of the electrode array was measured by the following processes: taking the electrode array out of the battery of each of the examples and comparative examples; then identifying the constituent materials of the electrode array by chemical analysis; and then calculating the CNF content by using the specific gravity of each constituent material and the volume of the electrode array.

(3) Calculation of CNF content rate relative to pore volume of electrode array

The results from the above measurements (1) and (2) were used to calculate the CNF content rate relative to the pore volume of the electrode array. The calculation results are shown in column "% Content" in section "Fibers" in Table 1.

TABLE 1

| | Fibers | | | | Fiber ratio before ionic liquid impregnation | | | | Method of injecting |
|---|---|---|---|---|---|---|---|---|---|
| | Material | Dimensions | % Content [vol %] | Ionic liquid | In positive electrode composite material [wt %] | In negative electrode composite material [wt %] | Thickness above separator [μm] | In ionic liquid [wt %] | ionic liquid and electrolyte solution |
| Comp. Ex. 1 | — | — | — | — | — | — | — | — | Electrolyte sol. alone injected |
| Comp. Ex. 2 | Cellulose | Diameter: 10 nm Length: 1 μm | 10 | — | — | — | 20 | — | |
| Comp. Ex. 3 | Cellulose | | 10 | — | 15 | — | — | — | |
| Comp. Ex. 4 | Cellulose | | 10 | — | — | 15 | — | — | |
| Ex. 1 | Cellulose | | 10 | Used | — | — | — | 7 | Electrolyte sol. injected after ionic liquid injection and impregnation |
| Ex. 2 | Cellulose | | 10 | Used | — | — | 20 | — | |
| Ex. 3 | Cellulose | | 10 | Used | 15 | — | — | — | |
| Ex. 4 | Cellulose | | 10 | Used | — | 15 | — | — | |
| Comp. Ex. 5 | Cellulose | Diameter: 1 μm Length: 1 mm | 10 | Used | — | — | — | 7 | |
| Comp. Ex. 6 | Cellulose | Diameter: 10 nm Length: 1 μm | 5 | Used | — | — | — | 3 | |
| Ex. 5 | Cellulose | | 30 | Used | — | — | — | 20 | |
| Ex. 6 | Cellulose | | 50 | Used | 15 | 15 | 20 | 20 | |
| Comp. Ex. 7 | Carbon nanotubes | | 10 | Used | — | — | — | 7 | |
| Comp. Ex. 8 | Alumina | | 10 | Used | — | — | — | 7 | |
| Ex. 7 | Cellulose | | 10 | Used | 3 | 3 | 4 | 4 | |
| Ex. 8 | Cellulose | | 10 | Used | 8 | 8 | — | — | |
| Ex. 9 | Cellulose | | 10 | Used | — | — | — | 7 | |
| Comp. Ex. 9 | Cellulose | | 10 | Used | — | — | — | 7 | |
| Comp. Ex. 10 | — | — | — | — | — | — | * | — | Electrolyte sol. alone injected |

| | Peel strength [N/m] | | | | Peel strength ratio | | Battery performance | |
|---|---|---|---|---|---|---|---|---|
| | Within positive electrode | Within negative electrode | Separator - (positive electrode) | Separator - (negative electrode) | Separator/ (current collector) | Between - positive-and-negative - electrodes | Resistance [mΩ] | Voltage drop during nail penetration ΔV [V] |
| Comp. Ex. 1 | 2.5 | 1.5 | 0.01 | 0.01 | 0.007 | 1.67 | 154 | 2.1 |
| Comp. Ex. 2 | 2.5 | 1.5 | 0.01 | 0.01 | 0.007 | 1.67 | 160 | 2.1 |
| Comp. Ex. 3 | 2.7 | 1.5 | 0.01 | 0.01 | 0.007 | 1.80 | 171 | 2.0 |
| Comp. Ex. 4 | 2.5 | 1.6 | 0.01 | 0.01 | 0.006 | 1.56 | 132 | 1.9 |
| Ex. 1 | 2.6 | 1.7 | 3.0 | 3.5 | 1.76 | 1.53 | 172 | 0.0 |
| Ex. 2 | 2.6 | 1.6 | 2.5 | 3.2 | 1.66 | 1.63 | 171 | 0.0 |
| Ex. 3 | 2.8 | 1.5 | 2.9 | 2.3 | 1.53 | 1.87 | 167 | 0.0 |
| Ex. 4 | 2.5 | 1.6 | 2.6 | 3.1 | 1.63 | 1.56 | 178 | 0.0 |
| Comp. Ex. 5 | 2.5 | 1.5 | 0.01 | 0.01 | 0.007 | 1.67 | 160 | 2.2 |
| Comp. Ex. 6 | 2.6 | 1.7 | 1.2 | 1.5 | 0.71 | 1.53 | 168 | 1.2 |
| Ex. 5 | 2.7 | 1.7 | 3.9 | 4.8 | 2.29 | 1.59 | 180 | 0.0 |
| Ex. 6 | 2.9 | 1.8 | 1.9 | 5.9 | 2.72 | 1.61 | 251 | 0.0 |
| Comp. Ex. 7 | 2.5 | 1.5 | 0.01 | 0.01 | 0.01 | 1.67 | Short circuit occurred during battery preparation | |
| Comp. Ex. 8 | 2.5 | 1.5 | 0.01 | 0.01 | 0.01 | 1.67 | 180 | 2.2 |
| Ex. 7 | 2.7 | 1.7 | 3.0 | 3.5 | 1.76 | 1.59 | 178 | 0.0 |
| Ex. 8 | 2.8 | 1.7 | 2.9 | 2.7 | 1.59 | 1.65 | 180 | 0.0 |
| Ex. 9 | 1.5 | 2.9 | 3.0 | 3.5 | 2.00 | 1.93 | 177 | 0.0 |
| Comp. Ex. 9 | 2.5 | 1.9 | 3.0 | 3.5 | 1.56 | 1.32 | 187 | 1.9 |
| Comp. Ex. 10 | 2.5 | 1.5 | 2.9 | 2.4 | 1.60 | 1.67 | 342 | 0.0 |

* Adhesive applied to the separator

<Results>

Referring to Table 1, it is clear that in the battery of each example (the battery subsumed within the non-aqueous electrolyte secondary battery according to the present disclosure), compared to the battery of each comparative example (the battery not subsumed within the present disclosure), a voltage drop during nail penetration was clearly mitigated and thereby the effect of mitigating a short circuit upon nail penetration was obtained.

Figure 2:
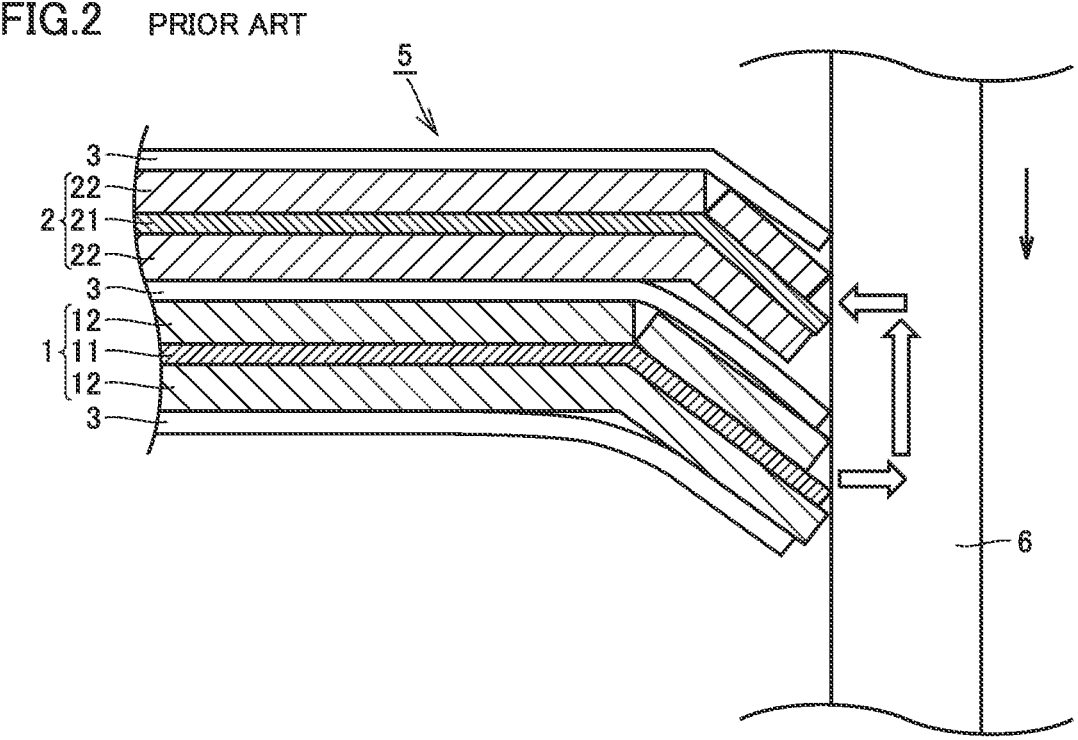
FIG. 2 is a conceptual sectional view of the electrode array for illustrating problems of a conventional non-aqueous electrolyte secondary battery.

In Comparative Examples 1 to 4, the weak peel strength between separator 3 and the electrode may have caused separation between the electrode and separator 3 upon nail penetration to allow them to move independently of each other. As a result, both positive electrode 1 and negative electrode 2 may have come into contact with nail 6 (as shown in FIG. 2) and thereby a short circuit may have flowed and caused an increased voltage drop.

In Example 1 in which electrode array 5 was impregnated with the CNF solution, the peel strength between separator 3 and the electrode composite material layer (the values specified in columns "Separator-(positive electrode)" and "Separator-(negative electrode)" in section "Peel strength" in Table 1) was improved and thereby a voltage drop was mitigated. This phenomenon may have been caused by a mechanism described below.

The CNFs (dissolved in the ionic liquid), which may have linked together, are infiltrated into the pores (these pores allowed for communication between separator 3 and the electrode); then the CNFs may have been deposited upon injection of the electrolyte solution; thereby, separator 3 and the electrode may have behaved as a one-piece component (namely, the peel strength between separator 3 and the electrode may have been improved). In addition, the strong hydrogen bond formed between the cellulose nanofibers may have also contributed to the improvement in the peel strength between separator 3 and the electrode. Furthermore, the between-positive-and-negative-electrodes peel strength ratio was not lower than 1.5 in Example 1. This ratio means that the interface between negative electrode current collector 21 and negative electrode composite material layer 22 had the smallest bonding strength (peel strength) of all the bonding strengths within electrode array 5.

Upon nail penetration into electrode array 5 in that state, detachment may have occurred between negative electrode current collector 21 and negative electrode composite material layer 22. As a result, it was highly likely that positive electrode 1 was sandwiched between two negative electrodes 2 (as shown in FIG. 1) and thereby negative electrode 2 alone came into contact with nail 6. Because nail 6 may not simultaneously have come into contact with both positive electrode 1 and negative electrode 2, a flow of a short-circuit current was mitigated.

In Examples 2 to 4, in which preparation of electrode array 5 (by addition of CNFs to constituent materials) was followed by impregnation with the ionic liquid before injection of the electrolyte solution, the peel strength between the separator and the electrode composite material layer was improved and a voltage drop during nail penetration was mitigated. In Comparative Examples 2 to 4, in which preparation of electrode array 5 (by addition of CNFs to constituent materials) was followed by injection of the electrolyte solution with no impregnation with the ionic liquid, however, the peel strength between separator 3 and the electrode composite material layer was not improved and a voltage drop during nail penetration occurred. These results suggest that in order to exhibit the effect of mitigating a short circuit upon nail penetration, the CNFs need not only to be simply present within electrode array 5 but also, for example, to be dissolved in the ionic liquid, be infiltrated into the pores in electrode array 5, and thereby improve the peel strength between separator 3 and the electrode composite material layer.

In Comparative Example 5, in which the CNFs had larger dimensions, neither the improvement in the peel strength between separator 3 and the electrode composite material layer nor the mitigation of a voltage drop during nail penetration was obtained. It may be because the CNFs with the large dimensions were not infiltrated into the pores in separator 3 and in the electrode composite material layer. These results also prove that for exhibiting the effect of mitigating a short circuit upon nail penetration, it is important for the CNFs to be infiltrated into and deposited within the pores in electrode array 5.

In Comparative Example 6, the peel strength between separator 3 and the electrode composite material layer was not much improved and a voltage drop during nail penetration was not sufficiently mitigated. It may be because the amount of CNFs was low.

In Example 6, an increase in battery resistance was observed. It may be because the amount of CNFs was too high and therefore the CNFs interfered with the movement of Li ions.

From these results, it is clear that the amount of CNFs needs to fall within the optimum range. More specifically, with the CNF content being too low, the effect of mitigating a short circuit upon nail penetration may not be obtained; with the CNF content being too high, the CNFs may interfere with the movement of Li ions and battery resistance may increase. As the values listed in column "% Content" in section "Fibers" in Table 1 (namely, the values of the CNF content rate of electrode array 5 relative to the total pore volume of electrode array 5) suggest, the CNF content rate may be preferably not lower than 10 vol % and not higher than 30 vol % of the total pore volume of electrode array 5.

In Examples 2 to 4, CNFs were added to only one component of electrode array 5; in Examples 7 and 8, CNFs were added to multiple components of electrode array 5 and the effect of mitigating a short circuit upon nail penetration was obtained. From these results, it is clear that CNFs need to be added to at least one of the electrode (electrode composite material layer) and the separator in order to exhibit the effect of mitigating a short circuit upon nail penetration. It should be noted that impregnation of the entire electrode array 5 (the electrode and separator 3) with CNFs may occur in either of the following two configurations: the configuration in which CNFs are dissolved in an ionic liquid and then the resulting ionic liquid is injected into the casing of the battery; and the configuration in which CNFs are added to at least one of the multiple components of electrode array 5 and then the resulting electrode array 5 is impregnated with an ionic liquid.

In Comparative Examples 7 and 8, in which carbon nanotubes or alumina nanofibers were used instead of CNFs, the peel strength was not improved and a voltage drop during nail penetration was not mitigated. These phenomena may have occurred due to any of various factors including the following: neither of the two non-CNF fibers being soluble in an ionic liquid and therefore the non-CNF fibers being unsuccessful in being infiltrated into the pores in the electrode array 5; the non-CNF fibers not strongly linking to each other; and the non-CNF fibers floating and moving in the electrolyte solution.

In Example 9, compared to Example 1, the amount of the binder in positive electrode composite material layer 12 was decreased and the amount of the binder in negative electrode composite material layer 22 was increased. These changes in amount caused a decrease in the peel strength between positive electrode current collector 11 and positive electrode composite material layer 12 and an increase in the peel strength between negative electrode current collector 21 and negative electrode composite material layer 22. As a result, the peel strength between negative electrode current collector 21 and negative electrode composite material layer 22 was higher than the peel strength between positive electrode current collector 11 and positive electrode composite material layer 12 (opposite to the case in Example 1). In Example 9, a voltage drop during nail penetration was also mitigated. From these results, it is clear that a voltage drop during nail penetration is mitigated in either the configuration (as in Example 1) in which the peel strength between positive electrode current collector 11 and positive electrode composite material layer 12 is higher than the peel strength between negative electrode current collector 21 and negative electrode composite material layer 22 or the configuration (as in Example 9) in which the peel strength between negative electrode current collector 21 and negative electrode composite material layer 22 is higher than the peel strength between positive electrode current collector 11 and positive electrode composite material layer 12.

In Comparative Example 9, however, the amount of the binder in negative electrode composite material layer 22 was increased compared to the amount in Example 1 and, thereby, the peel strength between negative electrode current collector 21 and negative electrode composite material layer 22 increased and the difference between the peel strength between positive electrode current collector 11 and positive electrode composite material layer 12 and the peel strength between negative electrode current collector 21 and negative electrode composite material layer 22 was small compared to that difference in Example 1. In Comparative Example 9, a voltage drop during nail penetration was not mitigated. It may be because detachment occurred at both the interface between positive electrode current collector 11 and positive electrode composite material layer 12 and the interface between negative electrode current collector 21 and negative electrode composite material layer 22 and, thereby, both positive electrode 1 and negative electrode 2 came into contact with nail 6 upon nail penetration to cause a flow of a short circuit.

As these results suggest, in order for detachment to occur at the interface between a certain electrode current collector and a certain electrode composite material layer (between positive electrode current collector 11 and positive electrode composite material layer 12, or between negative electrode current collector 21 and negative electrode composite material layer 22), the peel strength between positive electrode current collector 11 and positive electrode composite material layer 12 may need to differ by at least a predetermined amount from the peel strength between negative electrode current collector 21 and negative electrode composite material layer 22 (the greater may need to be at least 1.5 times greater than the smaller).

In Comparative Example 10, battery resistance increased. It may be because the cured product of the adhesive used for increasing the peel strength between separator 3 and the electrode composite material layer covered the contact area between separator 3 and the electrode composite material layer and thereby interfered with the transfer of Li ions between the electrodes.

In any of the above examples and comparative examples, electrode array 5 of the battery consists of one positive electrode 1, one separator 3, and one negative electrode 2. But the same effects as those obtained in the above examples and comparative examples may also be obtained in a battery (like the one shown in FIG. 1) that accommodates electrode array 5 consisting of a plurality of positive electrodes 1, a plurality of separators 3, and a plurality of negative electrodes 2 (namely, actual battery products). Examples are provided below. In the configuration of FIG. 2 in which electrode array 5 is composed of only the central separator 3 and its flanking positive electrode 1 and negative electrode 2 and when detachment occurs at both the interface between separator 3 and positive electrode composite material layer 12 and the interface between separator 3 and negative electrode composite material layer 22, both positive electrode 1 (positive electrode current collector 11) and negative electrode 2 (negative electrode current collector 21) come into contact with nail 6 to cause a short circuit to flow. In contrast to this, in the configuration of FIG. 1 in which electrode array 5 is composed of only the third separator 3 from the top and its flanking positive electrode 1 and negative electrode 2 and when detachment does not occur between separator 3 and positive electrode composite material layer 12 or between separator 3 and negative electrode composite material layer 22 but detachment occurs between negative electrode current collector 21 and negative electrode composite material layer 22, negative electrode 2 (negative electrode current collector 21) alone comes into contact with nail 6 (in other words, nail 6 does not simultaneously come into contact with both positive electrode 1 and negative electrode 2) and no short circuit flows. So, it is considered that the results of the above examples and comparative examples show the same tendencies as the tendencies that are expected to be shown by actual battery products that include electrode array 5 consisting of a plurality of positive electrodes 1, a plurality of separators 3, and a plurality of negative electrodes 2. Therefore, the discussion regarding the above examples and comparative examples may apply to actual battery products that include electrode array 5 consisting of a plurality of positive electrodes 1, a plurality of separators 3, and a plurality of negative electrodes 2.

The embodiments and examples disclosed herein are illustrative and non-restrictive in any respect. The technical scope indicated by the claims is intended to include any modifications within the scope and meaning equivalent to the terms of the claims.

What is claimed is:

1. A non-aqueous electrolyte secondary battery comprising:
   an electrode array; and
   an electrolyte solution,
   the electrode array including:
      a positive electrode, the positive electrode including a positive electrode current collector and a positive electrode composite material layer disposed on a surface of the positive electrode current collector;
      a negative electrode, the negative electrode including a negative electrode current collector and a negative electrode composite material layer; and
      a separator, the separator being interposed between the positive electrode and the negative electrode,
   the electrode array including cellulose nanofibers,
   at least one of the peel strength between the positive electrode current collector and the positive electrode composite material layer and the peel strength between the negative electrode current collector and the negative electrode composite material layer being smaller than both the peel strength between the separator and the positive electrode composite material layer and the peel strength between the separator and the negative electrode composite material layer, the greater of the peel strength between the positive electrode current collector and the positive electrode composite material layer and the peel strength between the negative electrode current collector and the negative electrode composite material layer being at least 1.5 times greater than the smaller of the two, the electrolyte solution containing a lithium salt and a solvent, the separator including separator pores, the positive electrode composite material layer including positive pores, the negative electrode composite material layer including negative pores, the cellulose nanofibers are disposed in the separator pores, the positive pores, and the negative pores, the cellulose nanofibers link to inner walls of the positive pores, the cellulose nanofibers link to inner walls of the negative pores, and the cellulose nanofibers link to inner walls of the separator pores.

2. The non-aqueous electrolyte secondary battery according to claim 1, further comprising an ionic liquid.

3. The non-aqueous electrolyte secondary battery according to claim 1, wherein the cellulose nanofiber content rate of the electrode array is not lower than 10 vol % and not higher than 30 vol % of a total pore volume of the electrode array, the total pore volume being a sum of a total volume of the separator pores, a total volume of the negative pores, and a total volume of the positive pores.

4. A method of producing the non-aqueous electrolyte secondary battery according to claim 1, the method comprising the steps, in the sequence set forth, of:

placing the electrode array comprising the positive electrode, the negative electrode, and the separator in a casing;

impregnating the electrode array with a cellulose nanofiber solution to provide a state in which the electrode array is immersed in the cellulose nanofiber solution, the cellulose nanofiber solution containing an ionic liquid and the cellulose nanofibers dissolved in the ionic liquid;

maintaining the state in which the electrode array is immersed in the cellulose nanofiber solution for a predetermined period of time; and after the predetermined period of time, injecting the electrolyte solution into the casing, the cellulose nanofiber content rate of the cellulose nanofiber solution being not lower than 4 mass % of the amount of the ionic liquid.

5. The method according to claim 4, wherein the cellulose nanofiber content rate of the cellulose nanofiber solution is lower than 20 mass % of the amount of the ionic liquid.

6. The method according to claim 4, wherein the impregnating step comprises impregnating the positive electrode composite material layer, the negative electrode composite material layer, and the separator with the cellulose nanofiber solution.

7. The method according to claim 4, wherein the ionic liquid is a salt in a liquid state.

8. The method according to claim 4, wherein the ionic liquid is represented by one or more of formulae (1) to (6) below:

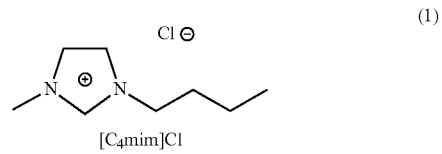

[C$_4$mim]Cl (1)

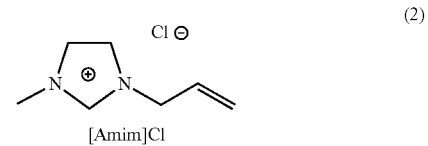

[Amim]Cl (2)

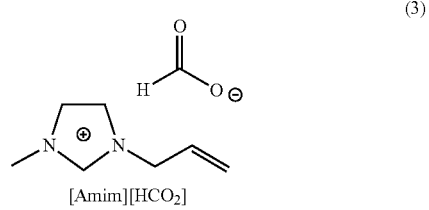

[Amim][HCO$_2$] (3)

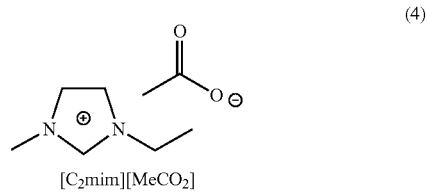

[C$_2$mim][MeCO$_2$] (4)

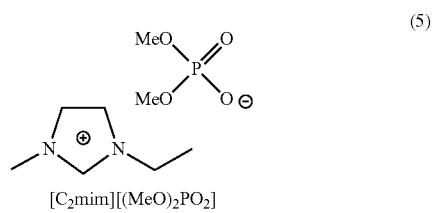

[C$_2$mim][(MeO)$_2$PO$_2$] (5)

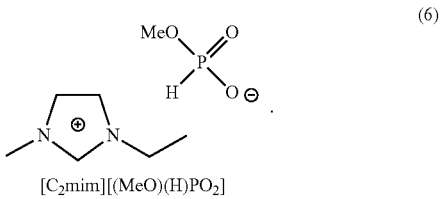

[C$_2$mim][(MeO)(H)PO$_2$] (6)

9. The non-aqueous electrolyte secondary battery according to claim 2, wherein the ionic liquid is a salt in a liquid state.

10. The non-aqueous electrolyte secondary battery according to claim 2, wherein the ionic liquid is capable of dissolving the cellulose nanofiber.

11. The non-aqueous electrolyte secondary battery according to claim 2, wherein the ionic liquid is represented by one or more of formulae (1) to (6) below:

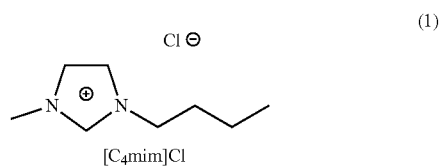

[C$_4$mim]Cl (1)

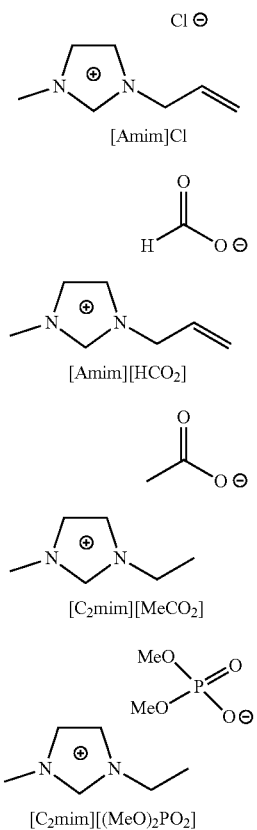

(2)

(3)

(4)

(5)

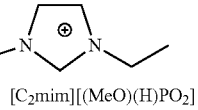

[C₂mim][(MeO)(H)PO₂]

(6)

12. The non-aqueous electrolyte secondary battery according to claim 1, wherein the cellulose fibers disposed in the separator pores directly contact the cellulose fibers disposed in the positive pores.

13. The non-aqueous electrolyte secondary battery according to claim 1, wherein the cellulose fibers disposed in the separator pores directly contact the cellulose fibers disposed in the negative pores.

14. The non-aqueous electrolyte secondary battery according to claim 1, wherein the cellulose fibers disposed in the separator pores are linked directly together with each other and contact the cellulose fibers disposed in the positive pores.

15. The non-aqueous electrolyte secondary battery according to claim 1, wherein the cellulose fibers disposed in the separator pores are linked directly together with each other and contact the cellulose fibers disposed in the negative pores.

* * * * *